United States Patent
Rissanen et al.

(10) Patent No.: US 7,136,634 B1
(45) Date of Patent: Nov. 14, 2006

(54) SYSTEM AND METHOD FOR DISPLAYING INFORMATION INCLUDED IN PREDETERMINED MESSAGES AUTOMATICALLY

(75) Inventors: Jussi Rissanen, Palaramoenre (FI); Erkki Tanskanene, Luhtipolku (FI); Mikko Makipaa, Helsinn (FI); Timo Pakkala, Saynavatie (FI); Esko Hannula, Vuorentausta (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/468,840

(22) Filed: Dec. 22, 1999

(51) Int. Cl.
*H04Q 7/20* (2006.01)
*A01K 5/02* (2006.01)
*G06F 15/16* (2006.01)

(52) U.S. Cl. .................. 455/422.1; 705/29; 709/206
(58) Field of Classification Search ........... 455/414, 455/422.1; 340/825.06; 709/206; 705/29
See application file for complete search history.

(56) References Cited

U.S. PATENT DOCUMENTS

| | | | |
|---|---|---|---|
| 4,825,045 A | 4/1989 | Humble | |
| 4,908,761 A | 3/1990 | Tai | |
| 4,910,672 A | 3/1990 | Off et al. | |
| 4,996,642 A | 2/1991 | Hey | |
| 5,053,957 A | 10/1991 | Suzuki | |
| 5,056,019 A | 10/1991 | Schultz et al. | |
| 5,173,851 A | 12/1992 | Off et al. | |
| 5,201,010 A | 4/1993 | Deaton et al. | |
| 5,327,508 A | 7/1994 | Deaton et al. | |
| 5,353,218 A | 10/1994 | De Lapa et al. | |
| 5,353,219 A | 10/1994 | Mueller et al. | |
| 5,481,094 A | 1/1996 | Suda | |
| 5,502,636 A | 3/1996 | Clarke | |
| 5,504,675 A | 4/1996 | Cragun et al. | |
| 5,508,695 A | 4/1996 | Nelson et al. | |
| 5,550,535 A | 8/1996 | Park | |
| 5,576,951 A | 11/1996 | Lockwood | |
| 5,583,763 A | 12/1996 | Atcheson et al. | |
| 5,592,560 A | 1/1997 | Deaton et al. | |
| 5,594,425 A * | 1/1997 | Ladner et al. | 340/825.49 |
| 5,612,868 A | 3/1997 | Off et al. | |
| 5,615,342 A | 3/1997 | Johnson | |
| 5,621,812 A | 4/1997 | Deaton et al. | |
| 5,625,776 A | 4/1997 | Johnson | |
| 5,638,457 A | 6/1997 | Deaton et al. | |
| 5,649,114 A | 7/1997 | Deaton et al. | |
| 5,710,887 A | 1/1998 | Chelliah et al. | |
| 5,715,399 A | 2/1998 | Bezos | |
| 5,832,457 A | 11/1998 | O'Brien et al. | |
| 5,870,030 A | 2/1999 | De Luca et al. | |
| 5,886,646 A | 3/1999 | Watanabe et al. | |
| 6,009,411 A | 12/1999 | Kepecs | |
| 6,026,370 A | 2/2000 | Jermyn | |
| 6,055,513 A | 4/2000 | Katz et al. | |

(Continued)

FOREIGN PATENT DOCUMENTS

WO    WO 01/47291    *    6/2001

*Primary Examiner*—William D. Cumming
(74) *Attorney, Agent, or Firm*—Banner & Witcoff

(57) ABSTRACT

A method and apparatus for use in a wireless telecommunications system including a wireless telecommunications network which communicates with a plurality of mobile terminals using radio signals, wherein each mobile terminal includes a display for displaying information. In the invention each mobile terminal is configured to receive a message containing information. Each message is inspected to determine whether the information contained in the message is of a predetermined type. If the message contains information of a predetermined type, the information is automatically displayed on the mobile terminal. If the message does not contain information of the predetermined type, the message is processed in a normal manner.

6 Claims, 7 Drawing Sheets

U.S. PATENT DOCUMENTS

| | | |
|---|---|---|
| 8,055,573 | 4/2000 | Garenswartz et al. |
| 6,067,524 A | 5/2000 | Byerly et al. |
| 6,076,068 A | 6/2000 | De Lapa et al. |
| 6,112,981 A | 9/2000 | McCall |
| 6,123,259 A | 9/2000 | Ogasawara |
| 6,199,102 B1 * | 3/2001 | Cobb .......................... 709/206 |
| 6,374,102 B1 * | 4/2002 | Brachman et al. .......... 455/422 |

* cited by examiner

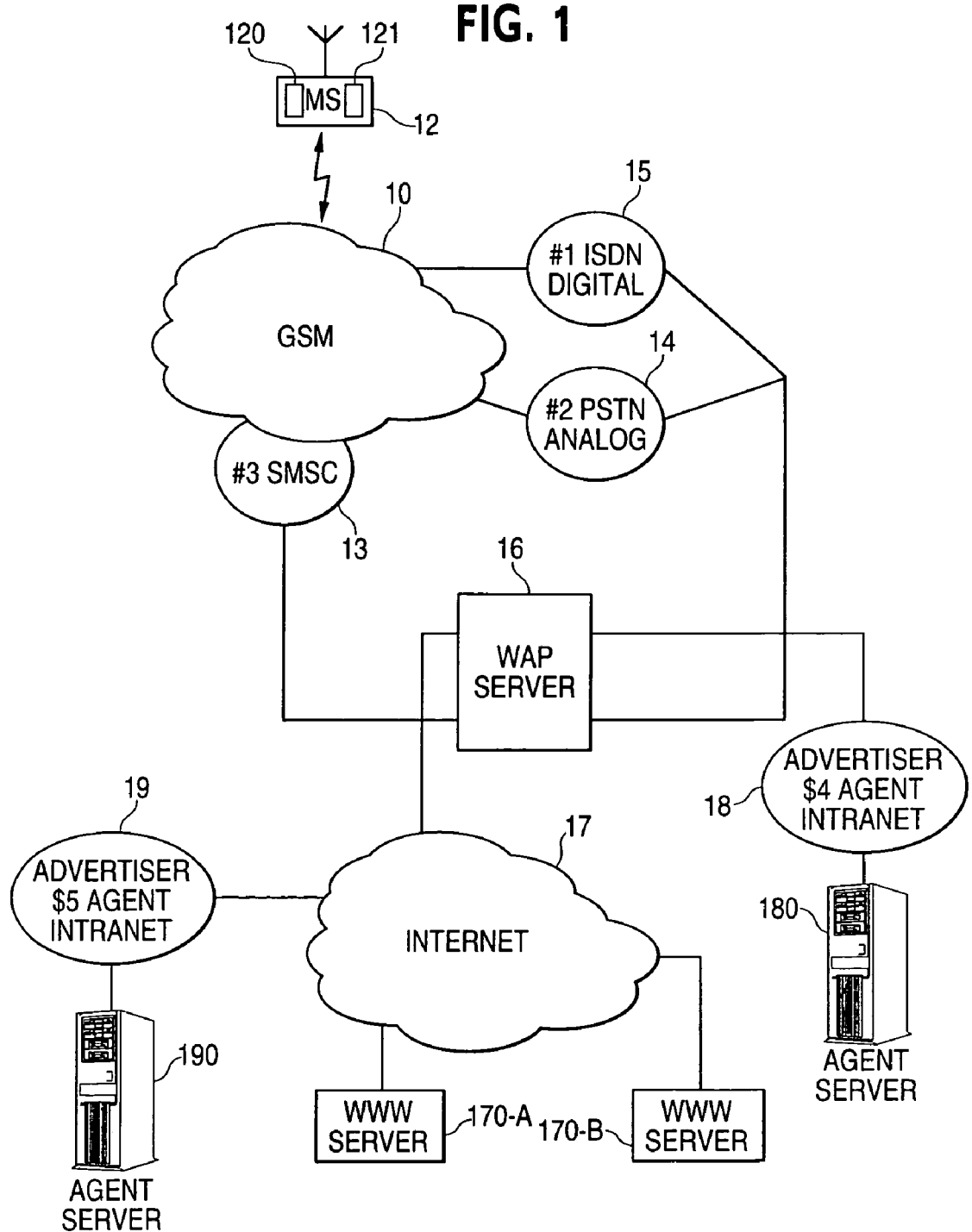

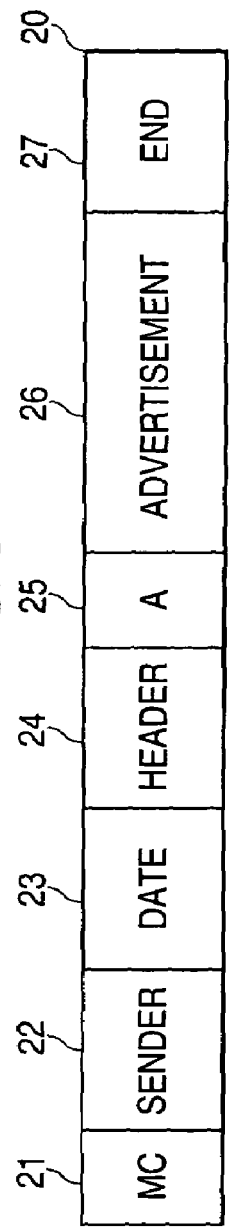

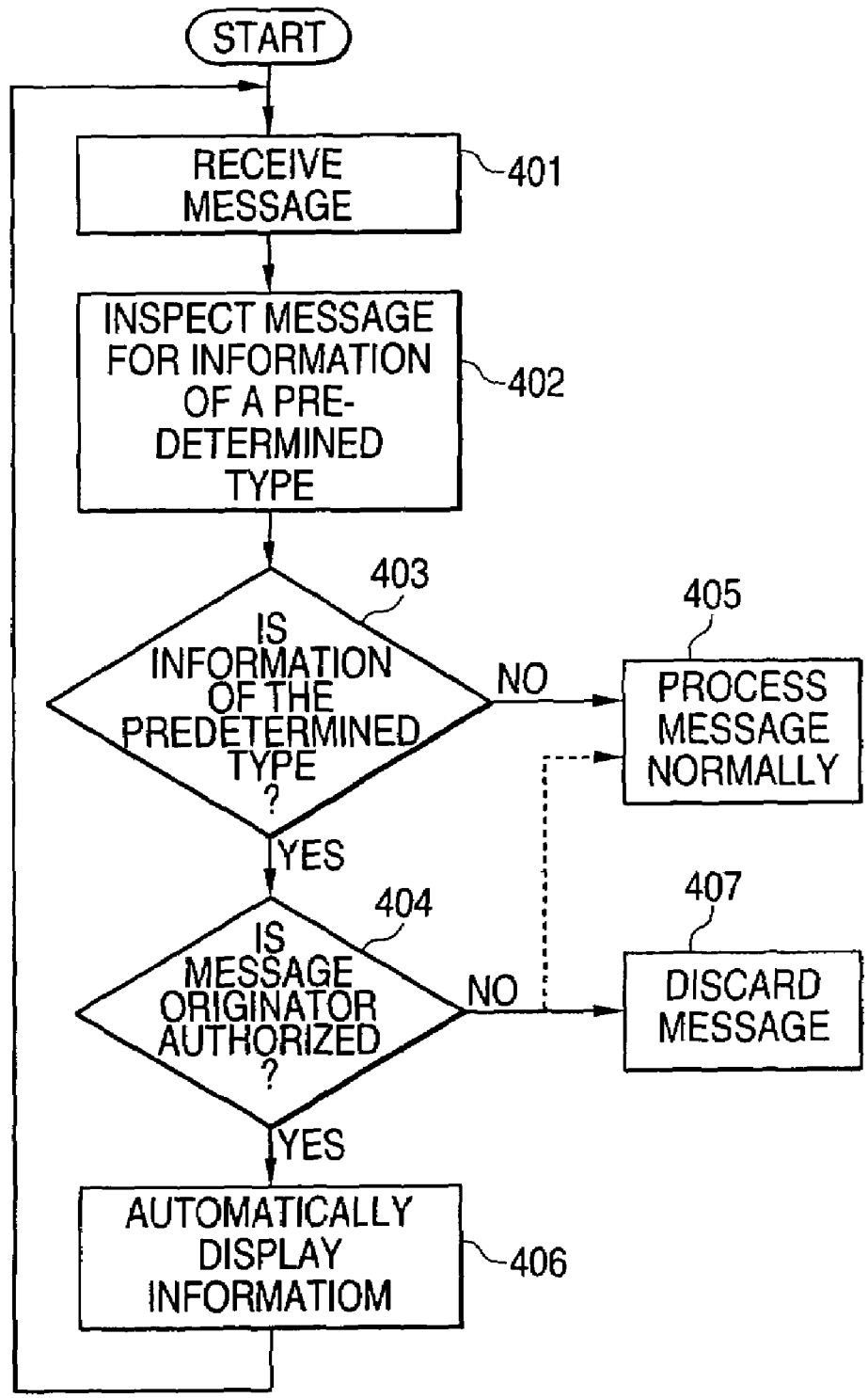

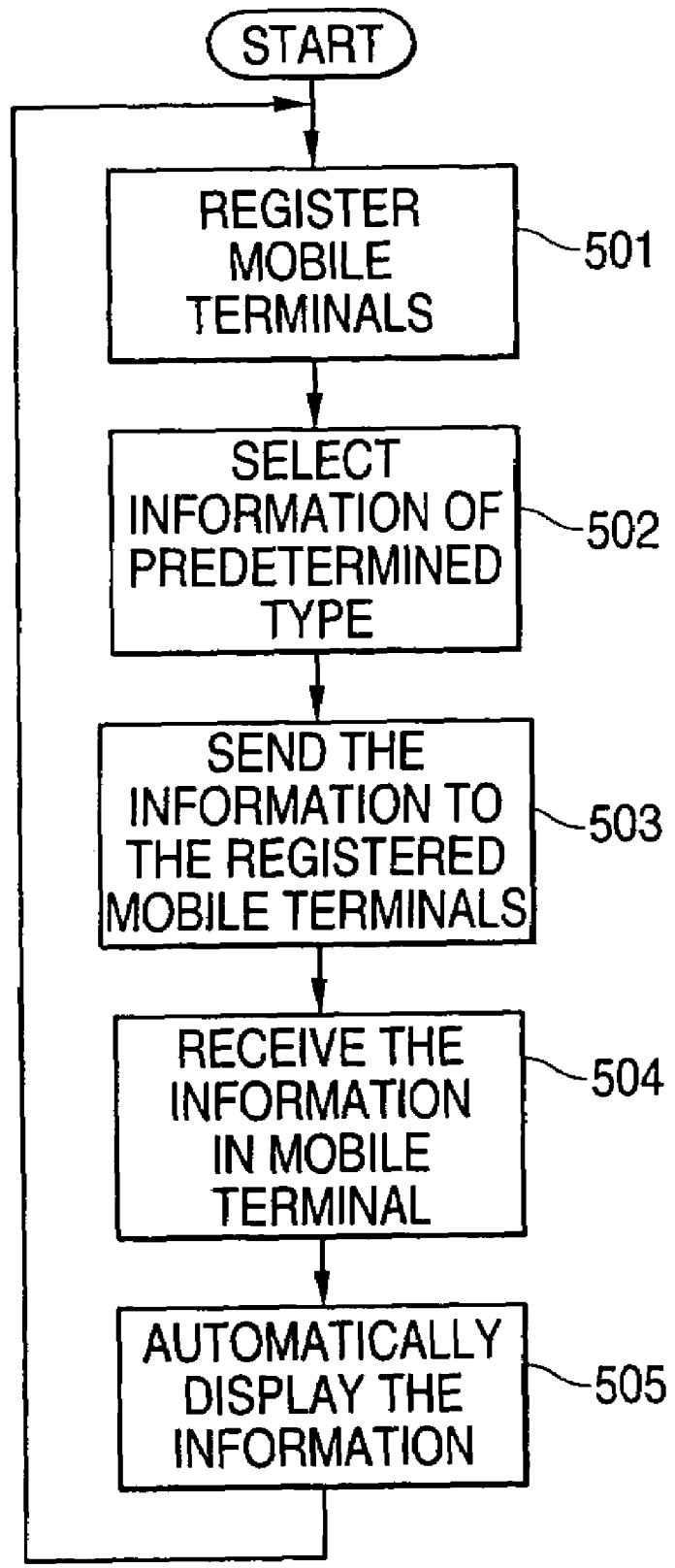

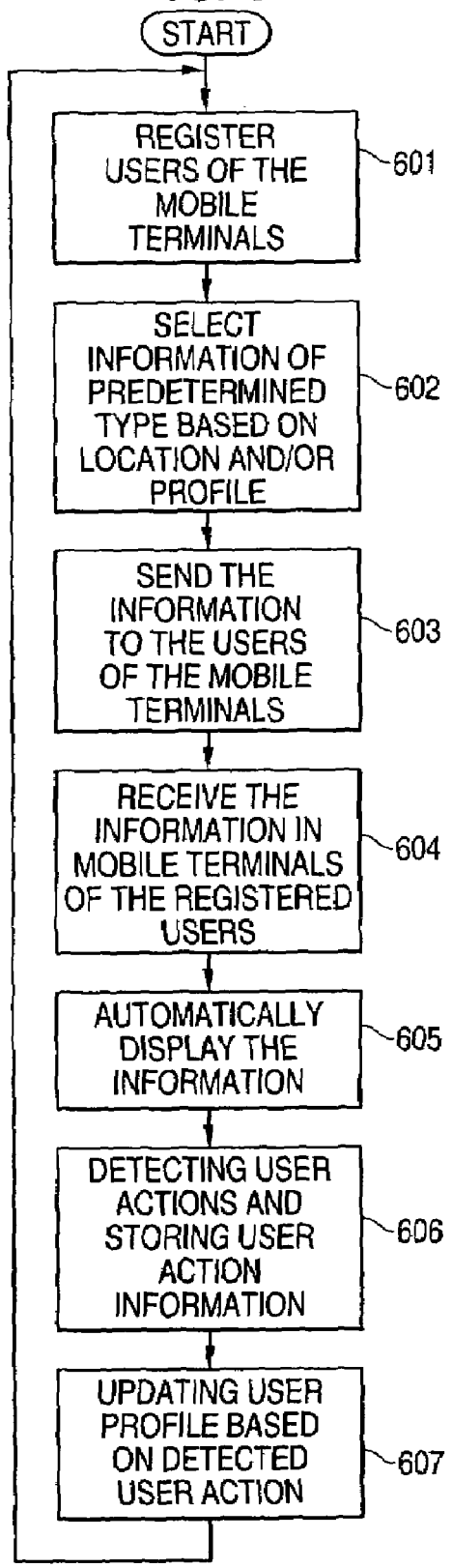

EXAMPLES OF DISPLAY

SYSTEM AND METHOD FOR DISPLAYING INFORMATION INCLUDED IN PREDETERMINED MESSAGES AUTOMATICALLY

BACKGROUND OF THE INVENTION

The present invention relates to a method and apparatus for automatically displaying information sent to a mobile terminal on the screen of the mobile terminal. More particularly, the present invention relates to a method and apparatus for automatically displaying information of a predetermined type such as advertising on the screen of a mobile terminal without user intervention and use of storage normally used for storing messages.

Telecommunications systems and services today are in an era of rapid evolution in providing alternatives to the wired Public Switched Telephone Network (PSTN). The most common alternative to the conventional subscriber PSTN involves the use of mobile terminals in a wireless telecommunications system operated according to the Global System for Mobile telecommunications (GSM) or the Code Division Multiple Access (CDMA) standards. These mobile terminals and wireless telecommunications system can also be configured to operate according to the Wireless Application Protocol (WAP) thereby permitting their use in any location in the world and for Internet access. As the technology improves, increasing numbers of individuals will have in their possession mobile terminals and use them to perform a myriad of functions including placing and receiving telephone calls.

Each mobile terminal is configured to include at least a display for displaying information for guiding the user in operating the mobile terminal, information regarding the status or mode of operation of the mobile terminal, information of incoming and outgoing calls and information including, for example, an user logo identifying the Telecommunications Service Provider providing telecommunications services to the mobile terminal over the wireless telecommunications system.

Using the display of each mobile terminal for displaying information other than that described above is desired. Particularly, it is desired to permit other information such as, for example, advertising provided by advertisers to promote various products and services, or warnings of impending events provided by governmental and quasi-governmental organizations to be display on the display of each mobile terminal.

However, according to the conventional technique, any information sent to the mobile terminal is sent as part of a message which requires the user of the mobile terminal to perform an action to receive and/or view the information contained in the message. Further, such messages are stored in the storage of the mobile terminal to await actions by the user, thereby occupying precious memory space preventing the storage of normal messages.

SUMMARY OF THE INVENTION

The present invention provides a method and apparatus for automatically displaying information of a predetermined type contained in a message on the display of a mobile terminal without intervention on the part of the user or the use of storage normally used for storing messages.

The present invention is intended to operate in a wireless telecommunications system including a wireless telecommunications network which communicates with a plurality of mobile terminals using radio signals. Each of the mobile terminals includes a display for displaying information. The information can, for example, be information for guiding the user in the operation of the mobile terminal, information of incoming and outgoing calls, information of the status and mode of operation of the mobile terminal or information such as an user logo identifying the Telecommunications Service Provider providing telecommunication services to the mobile terminal.

According to the present invention, the mobile terminal receives messages containing information from the wireless telecommuications network. Each of the messages is inspected to determine whether the message contains information of a predetermined type. Also the identity of the originator of the message can be reviewed to determine whether the originator is authorized to send messages containing information of a predetermined type. If the message contains information of the predetermined type and the originator is authorized to send such messages, then the information is automatically displayed on the display of the mobile terminal. If the originator is not authorized, then the message is discarded. If the message does not contain information of the predetermined type, then processing of the message is conducted in the normal manner.

The present invention provides for the automatic display of the information of the predetermined type on the display of the mobile terminal where the information of the predetermined type can, for example, be advertising/promotional information from a provider of a product or service, warnings of impending events sent by governmental or quasi-governmental organizations, or information from an individual or organization authorized to provide information that can be automatically displayed on the mobile terminal.

The present invention operates in a manner so as not to require any actions on the part of the user to cause the receipt and display of the information of the predetermined type. Further, the present invention does not require the message containing the information of the predetermined type to be stored in storage normally used for storing messages to be processed. Thus, the storage for storing normally processed messages remains free for its intended use.

BRIEF DESCRIPTION OF THE DRAWINGS

The present invention will be more apparent from the following detailed description, when taken in conjunction with the accompanying drawings, in which:

FIG. 1 is a system diagram of a wireless telecommunications system according to the present invention;

FIG. 2 is a schematic diagram illustrating the format of a message containing information of a predetermined type according to the present invention;

FIG. 3 is a table of a database of profiles of users of the mobile terminals according to the present invention;

FIG. 4 is a flowchart of operations performed by the mobile terminal according to the present invention;

FIG. 5 is a flowchart of operations performed by the wireless telecommunications system according to the present invention;

FIG. 6 is a flowchart of the operations performed by the wireless telecommunications system according to the present invention.

DETAILED DESCRIPTION OF THE INVENTION

Figure 7A:
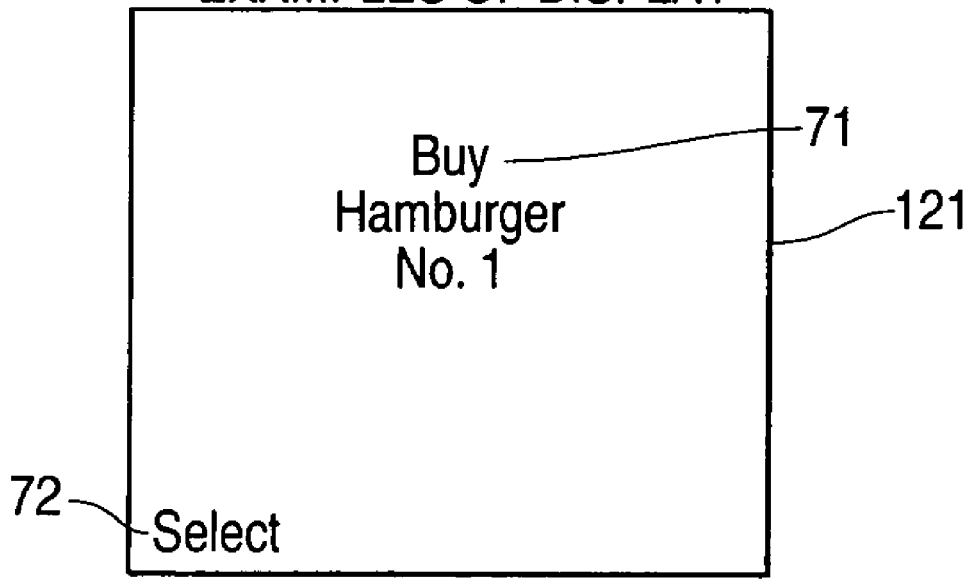
FIGS. 7A–B are schematic diagrams illustrating the display of information of a predetermined type on the display of a mobile terminal according to the present invention.

The present invention shall be described relative to FIGS. 1–6, 7A and B. However, it should be noted that the present invention as illustrated in FIGS. 1–6, 7A and B is representative of an embodiment of the present invention. The present invention is not limited to the embodiment illustrated. The present invention can be implemented according to any number of embodiments with the primary feature being the automatic display of information of a predetermined type, such as advertising, on the screen of a mobile terminal without user intervention and use of storage normally used for storing messages.

The present invention is intended to operate in a wireless telecommunication system such as that illustrated in FIG. 1. The wireless telecommunications system illustrated in FIG. 1 is merely representative of a simplified network architecture that may take on any number of constructions. The wireless telecommunications system as illustrated in FIG. 1 includes a wireless telecommunications network 10 which communicates with a plurality of mobile terminals 12 using radio signals. Each mobile terminal is configured to include at least a storage 120 for storing messages and a display 121 for displaying information. The telecommunications system can operate according to the GSM or CDMA or similar standards for wireless telecommunications and possibly additionally the WAP protocol or similar such protocols. Further, any combination of a standard and protocol is possible. For example, a packet switched connection, such as GPRS (which is a GSM standard) could be used and HTML can be used instead of WAP. FIG. 1 illustrates the wireless telecommunications system operating according to GSM and the WAP. However, any other standard or protocol can be used.

The wireless telecommunications network 10 can include a Short Message Service Center (SMSC) 13 which provides for the transmission of short messages to the mobile terminals 12. Use of the SMSC allows for "push" messaging to be performed, where certain types of messages are pushed to the mobile terminal. An SMS message could, for example, include alphanumeric information which is to be transmitted between mobile terminals 12 or other terminals connected to wired telecommunications systems or packet switched networks (e.g., Internet, Intranet) connected to the wireless telecommunications network 10. SMS messages are typically received by a mobile terminal 12 and stored in the storage 120 of the mobile terminal 12 for later access by the user. The user of the mobile terminal is notified of receipt of each SMS message by, for example, indicator information on the display 121 of the mobile terminal 12 or by audio or vibratory information. The user of the mobile terminal 12 is required to perform some action to view the message. If the user chooses to view the message, the message is retrieved from the storage 120 and then displayed on the display 121 of the mobile terminal 12.

The wireless telecommunications network 10 as illustrated in FIG. 1 is connected to wired telecommunications systems including, for example, a PSTN 14 for the transmission of analog signals and an Integrated Services Digital Network (ISDN) 15 for transmission of digital signals. The wireless telecommunications network 10 can also be connected to packet switched networks including, for example, the Internet 17 or Intranets 18, 19 via a server 16. The wireless telecommunications network 10 can, for example, be connected to the server 16 via the SMSC 13. The server 16 can, for example, operate according to the WAP. The WAP server 16 is also connected to the PSTN 14 and the ISDN 15.

An agent server 180 can be connected to the Intranet 18 which is connected to the WAP server 16. Web servers 170A, 170-B can be connected to the Internet 17 which is connected to the WAP server 16. An agent server 190 can be connected to the Intranet 19 which is connected to the Internet 17 which is connected to the WAP server 16.

The WAP server 16 implements operation according to the WAP so that efficient communications can be carried to and from the mobile terminal 12 through the wireless telecommunications network 10 and to and from the agent and web servers 190, 180 and 170 through the Internet 17 or the Intranets 18, 19. More particularly, the WAP server 16 allows the user to "surf" the web to a website (WAP site), for example, after receiving a message containing a URL to obtain information.

The agent server 180 through its Intranet 18 can, for example, be the server used by a product or service provider (retailer, manufacturer, etc.) to provide advertising type information which is to be automatically displayed on the display of a mobile terminal when received. Alternatively, the agent server 180 could be used by a governmental or quasi-governmental organization to provide warning type information concerning impending events to the mobile terminals or by individuals or organizations authorized to provide information of their choosing to the mobile terminals.

The web servers 170A, B through the Internet 17 can, for example, be used by product or service providers, governmental organizations or authorized individuals or organizations in the same manner as the agent server 180 described above. Particularly, the web servers 170-A, B can provide via the Internet 17 and the WAP server 16 various web pages containing predetermined types of information to be automatically displayed on the display of the mobile terminals. Further, the agent server 190 through its Intranet 19 and the Internet 17 can, for example, provide predetermined type of information similar to the agent server 180 described above.

In the system illustrated in FIG. 1, information of a predetermined type can come from any one or combination of the servers 170, 180, 190. Information of a predetermined type (advertising, warnings, authorized information, etc.) can be sent from the server 170, 180, 190 through the WAP server 16 through one of the PSTN 14 or ISDN 15, through the wireless telecommunications network 10 and to one or more of the mobile terminals 12. The information once received at the mobile terminal is automatically displayed on the display 121 of the mobile terminal 12. The information of the predetermined type can follow a path through the Internet 17 and WAP server 16, if from the web servers 170A, B. Also the information can follow a path through the Intranet 18 and WAP server 16 if from the agent server 180. Further, the information can follow a path through the Intranet 19, Internet 17 and WAP server 16, if from the agent server 190. The information of the predetermined type is transmitted from the servers 170, 180, 190 as part of a message having a particular format. The messages from the servers 170, 180, 190 are sent as radio signals by the wireless telecommunications network 10 to the mobile terminal 12.

The mobile terminal responds to messages sent from the wireless telecommunications network 10. These messages may, for example, be sent from a message center such as the SMSC 13 included in the wireless telecommunications network 10. The format of each message 20 can, for example, be such as that illustrated in FIG. 2. The format of the message can take any form and be constructed according to any protocol or standard. The message 20 as illustrated in FIG. 2 has a plurality of fields each containing different information used by the mobile terminal 12 to determine how and in what manner the message 20 is to be processed. The message 20 could, for example, include information for creating essentially a screen saver for the mobile terminal with the content of the screen saver being delivered over the wireless telecommunications network. The text or content of the message, for example, could be animated or move across the screen. The message also could include other types of media such as audio, video, graphics and animation that is supported by the terminal so as to deliver the predetermined type of the information to the user.

Figure 8:
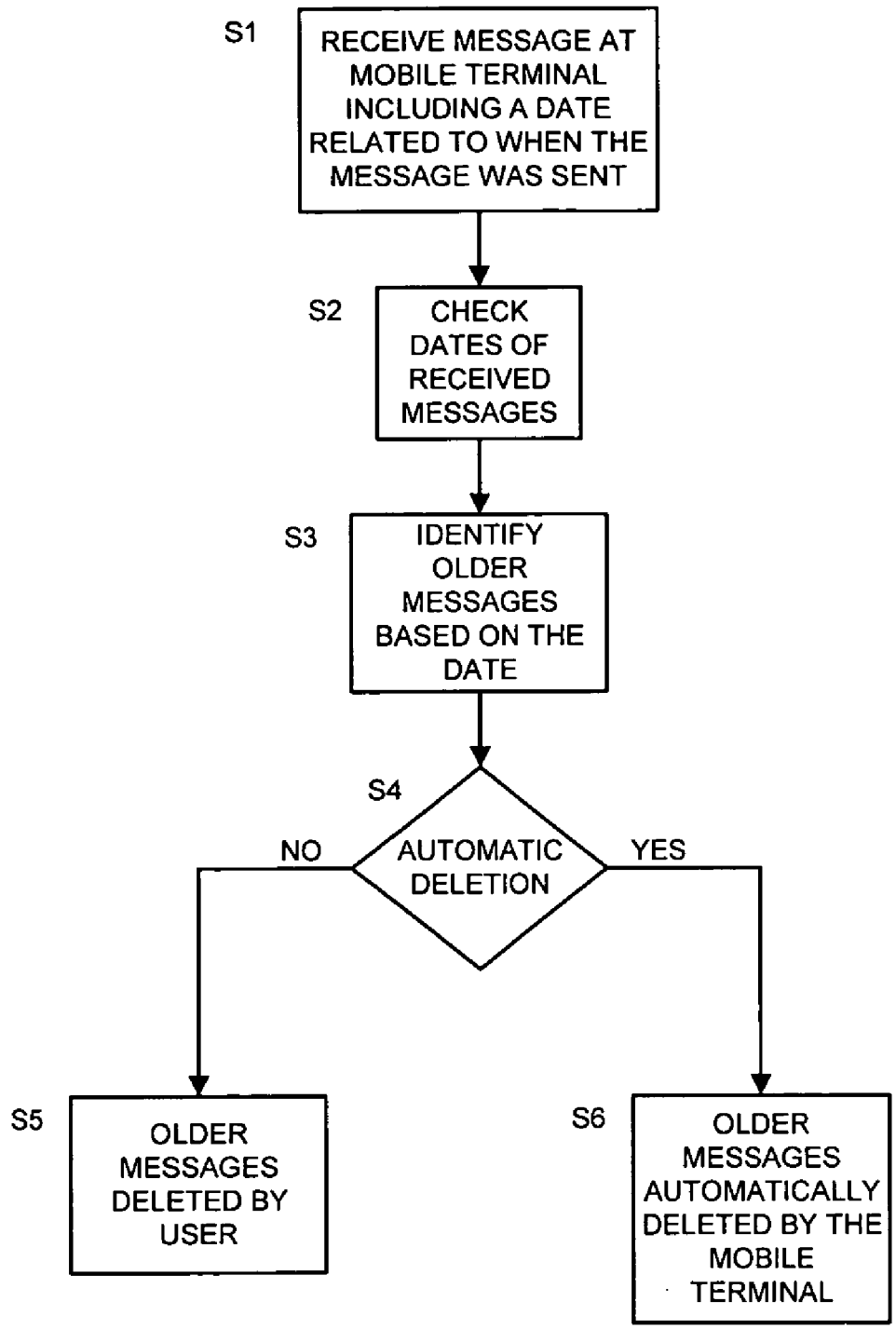
FIG. 8 shows a flowchart of a process for automatic deletion of older messages according to an example embodiment of the present invention.

For example, included in the message 20 is a Message Center (MC) field identifying the message as having been sent from the SMSC 13. A sender field 22 is included in the message 20 to provide information identifying the sender of the message 20. A date field 23 is included in the message 20 to indicate the date on which the message 20 was sent. Date information in the date field 23 could, for example, be used to inform the user of the mobile terminal 12 the date the message was sent so that older messages can be deleted by the user or deleted automatically by the mobile terminal 12. FIG. 8 shows a flowchart of a process for automatic deletion of older messages according to an example embodiment of the present invention. A message is received at the mobile terminal including a date related to when the message was sent, S1. Dates of received messages are checked, S2. Older messages are identified based on the date, S3. It is determined if automatic deletion is desired, S4. If not, older messages may be deleted by the user, S5. If automatic deletion is desired, older messages may be automatically deleted by the mobile terminal, S6. A header field 24 is included in the message 20 containing information indicating the type of message being sent (e.g., SMSC message). An information type indicator field 25 is included in the message 20 to indicate the type of information (e.g., advertising, warning, authorized information, SMS message information) contained in the message 20. Thus, for example, as illustrated in FIG. 2, the information type indicator field could include an "A" indicating that the message contains advertising type information. An end field 27 is included in the message 20 to indicate the end of the message 20. The length of the end field 27 can be variable.

According to the present invention, the mobile terminal 12 receives messages each having a format such as that illustrated in FIG. 2. Thus, each message 20 carries information from the wireless telecommunications network 10 to the mobile terminal 12 for processing or automatic displaying by the mobile terminal 12. Each message 20 is inspected to determine whether the message contains information of a predetermined type. As per the format illustrated in FIG. 2, the message 20 could include in the information type indicator field 25 information indicating that the information contained in the message 20 is, for example, an advertisement, a warning of an impending event sent, or authorized information.

If upon inspection of the information type indicator field 25 it is determined that the information is of any of the above described types for automatic display, then the information is automatically displayed on the display 121 of the mobile terminal 12. If upon inspection of the information contained in the information type indicator field 25 it is determined that the information contained in the message is not one of the above described types, then the message is processed in the normal manner. The normal manner could, for example, be a processing normally performed when the message is a SMSC message containing SMS message information. This normal processing includes at least storing the message in the storage 120 of the mobile terminal for later access by the user of the mobile terminal.

The message can also be inspected to verify the originator of the message. The wireless telecommunications network and each of the terminals could be set so that only message originators that are verified as trusted sources, or message originators that are given permission to send such messages, are allowed to send messages to the terminals to be automatically displayed on the displays of the terminals. Such a verification prevents anyone from sending unwanted messages to each of the terminals since such messages are automatically displayed on the screen of the mobile terminals 12 without user intervention. The verification of message originators can be accomplished by each terminal storing information identifying verified originators and comprising such stored information with information included in each message identifying the originator of the message. The information in each message can, for example, be information that cannot be modified or information such as a digital signature identifying the message originator. In each terminal once the information contained in each message is compared to the pre-stored information identifying verified originators, then the message is either discarded or automatically displayed depending on whether a match is found between the pre-stored information in the mobile terminal and the originator identifying information in the message. The message is discarded if the originator of the message is not a verified originator and is automatically displayed on the screen of the mobile terminal if the originator is a verified message originator.

The above described operations performed by the mobile terminal 12 and the operations performed by the wireless telecommunications system including the mobile terminal and the wireless telecommunication network 10 are described below with respect to FIGS. 4–6.

The operations performed by the mobile terminal 12 are illustrated in FIG. 4. These operations could, for example, be implemented by hardware, software or a combination of hardware and software. As per FIG. 4, the mobile terminal 12 receives a message from the wireless telecommunications network 10 (step 401). Upon receiving the message the mobile terminal 12 determines whether the message contains information of a predetermined type (step 402). If the information is of the predetermined type namely, for example, an advertising, warning, authorized user information, etc. (step 403), then the message is inspected to determine if the originator of the message is authenticated (authorized) to send such messages (step 404). If the information is not of the predetermined type, then the message is processed in the normal manner (step 405) such as, for example, the normal processing conducted on a SMS message. If the message is from an authorized originator, then the information contained in the message is automatically displayed on the screen of the mobile terminal 12 (step 406). If the message is not from an authorized originator, then the message is discarded (step 407) or possibly under certain circumstances processed normally (step 405). The information identifying the authorized message originators can, for example, be stored in each mobile terminal 12 at the time the mobile terminal 12 registers for wireless telecommunications service from a service provider. At such time, when the mobile terminal registers for service from the service provider, the service provider can send to the mobile terminal 12 various information identifying originators authorized to send messages which are automatically displayed on the screen of the mobile terminal without user intervention.

The present invention also provides for operations which are performed so as to register users of particular ones of the mobile stations so that selected information of a predetermined type are sent to the registered user. The operations performed for registering users of mobile terminals, selecting particular information to be sent to the mobile terminals being used by the registered users and sending the information via the wireless telecommunications network 10 to the mobile terminals 12 being used by the registered users are performed by the telecommunications system including the wireless telecommunications network 10 and the mobile terminals operating in combination with the WAP server 16 and any one or combination of the agent and web servers 180, 190, 170.

Thus, according to the flowchart illustrated in FIG. 5 particular mobile terminals operated in the wireless telecommunications system are registered, for example, in the agent server 190 (step 501). Registration of a mobile terminal could, for example, be accomplished by storing information concerning the mobile terminal in a table 30 (database) such as that illustrated in FIG. 3. The database can, for example, store with respect to each mobile terminal model number information 31 of the mobile terminal being used by the user, mobile terminal subscriber information 33 including, for example, a telephone number of the mobile terminal, profile information 34 indicating, for example, various characteristics including buying habits of the user of the mobile terminal, an SMSC address information 36 indicating a location address of the mobile terminal to permit messages to be quickly sent to the mobile terminal and user action information 37 indicating the history of actions taken by the user with respect to the information automatically displayed on the display of the mobile terminal. The user action information could, for example, indicate that the user purchased the item last advertised, moved to a location to avoid an impending event, provided corrections to sales information sent to the mobile terminal, etc. It should be noted that updates to the user action information 37 occurs after the information of the predetermined type has been displayed on the display of the mobile terminal. Thus, the user action information 34 can in effect be history information indicating the history of actions taken by the user regarding information automatically displayed on the display of the mobile terminal being used by the user.

As illustrated in FIG. 5, once the mobile terminals have been registered according to step 501, then information to be sent to the registered mobile terminals is selected (step 502). Once the information to be sent has been selected the information is formed into a message which is sent to the registered mobile terminals via the wireless telecommunications network 10 (step 503). Each mobile terminal upon receipt of the message containing the information, performs a step of receiving the message containing the information (step 504). Thereafter, the mobile terminal 12 automatically displays the information contained in the message on the display of the mobile terminal (step 505).

According to the flowchart illustrated in FIG. 6 particular users of the plurality of mobile terminals operated in the wireless telecommunications system can be registered so that selected information of a predetermined type can be provided to the registered users through their mobile terminals when the users enter a predetermined area or location. The method illustrated in FIG. 6 provides unique advantages to providers of products and services, governmental and quasi-governmental organizations and authorized individuals and organizations of the ability to provide information appropriate for viewing by the registered user when the registered user enters a predetermined area or location.

According to the flowchart illustrated in FIG. 6 particular users of the plurality of mobile terminals operated in the wireless telecommunications system are registered, for example, in the agent server 190 (step 601). Registration of the user could, for example, be accomplished by storing information concerning the user and the mobile terminal operated by the user in a database having a table 30 as illustrated in FIG. 3. The location of the user of the mobile terminal is determined (step 602). Location information of a registered user using a mobile terminal can be determined by any number of well known methods such as, for example, the Global Positioning System (GPS) or by processes conducted within the wireless telecommunications network 10 including the use of the SMSC address information 36 stored in table 30.

Based on the location information of the user or based on the location information of the user and the profile of information 34 of user as stored in the table 30 illustrated in FIG. 3, particular information of a predetermined type is selected for sending to the mobile terminal being used by the user (step 603). The selected information could, for example, be information from a provider of a product or service, when the user is in the location of a retail establishment carrying the product or service, an emergency notice from a governmental or quasi-governmental organization warning the user of a dangerous situation occurring in the location, or information from an authorized individual or organization notifying the user of an emergency meeting. Further, according to the FIG. 6 the selected information is sent to the mobile terminal being used by the registered user (step 604). The information sent to the mobile terminal being used by the registered user is automatically displayed on the display of the mobile terminal (step 605).

Figure 7B:
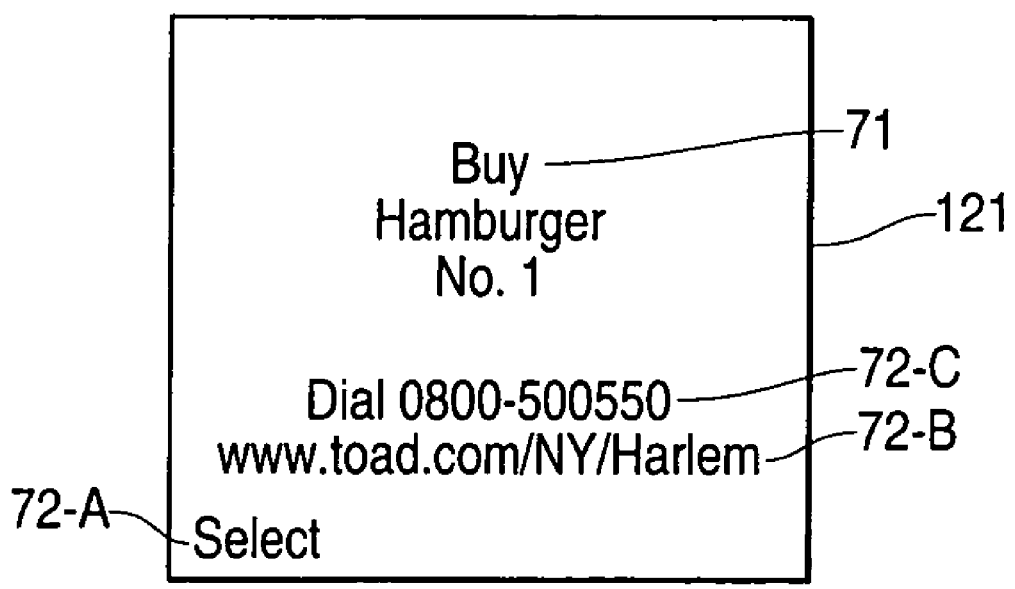

It should be noted that the information which is automatically displayed on the display of the user could, for example, be configured in the manner illustrated in FIGS. 7A–B. In FIGS. 7A and B the display 121 could, for example, display the information of the predetermined type "Buy Hamburger No. 1" 71 and provide additional information such as menu items 72-A to allow the user to perform some type of action relative to the displayed information of the predetermined type. In this example a "select" menu item is displayed. Examples of other menu items 72-B and C that can be provided are illustrated in FIG. 7B. For example, one menu item could be the telephone number of the provider of the product or service. Selection of this menu item by the user causes the mobile terminal to automatically dial the telephone number of the provider of the product or service. Another menu item could, for example, be a link to a web page. Selection of this menu item by the user causes the mobile terminal to automatically display the web page to which the link is directed. The information when displayed on the display of the mobile terminal an be coupled with other operations by the mobile terminal to get the attention of the user. These operations could, for example, be displaying an indicator on the display including blinking, generating an audio signal or causing the mobile terminal to vibrate.

As illustrated in FIG. 6 any action performed by the user relative to the information being displayed is detected (step 606) and then recorded or used to update the profile information 34 or the user action information 37 of the user in table 30 (step 607).

Thus, according to the above, the present invention provides a method and apparatus for automatically displaying information of a predetermined type contained in a message on the display of a mobile terminal without intervention on the part of the user or use of storage normally used for storing messages. According to the present invention, a mobile terminal, being operated in a wireless telecommunications system including a plurality of the mobile terminals and a wireless telecommunications network, receives messages containing information from the wireless telecommunications network. Each of the messages are inspected to determine whether the message contains information of a predetermined type. If the message contains information of a predetermined type, then the information contained in the message is automatically displayed on the display of the mobile terminal. If the message does not contain information of a predetermined type, then processing of the messages is conducted in a normal manner. The present invention also provides for the detection and recording of actions taken by the user relative to the information which has been automatically displayed on the display of the mobile terminal.

Accordingly, the present invention provides a unique method and apparatus which allows for providers of products and services, governmental and quasi-governmental organizations, authorized individuals and organizations, and the like, to provide information of a predetermined type to users of mobile terminals and have such information automatically displayed on display of the mobile terminal.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. In a wireless telecommunications system including a wireless telecommunications network which communicates with a plurality of mobile terminals using radio signals, wherein each mobile terminal includes a display for displaying information, a method of automatically displaying information of a predetermined type on said display comprising:

receiving in a mobile terminal a message containing information and a date;

determining whether said information contained in said message is of a predetermined type;

determining, when said information is of said predetermined type, whether an originator of said message is authorized to send said message containing information of said predetermined type, and, if said originator of said message is not authorized, discarding said message;

if said message contains information of said predetermined type and said originator of said message is authorized, automatically displaying said information on said display of said mobile terminal; and if said message does not contain information of said predetermined type, processing said message in accordance with the message and storing said message in a storage for later access by a user of the mobile terminal, wherein the date is related to when the information was sent to the mobile terminal, older dated information being deleted by one of a user of the mobile terminal and automatically by the mobile terminal based on the date.

2. A mobile terminal comprising:

a display for displaying information, wherein the mobile terminal, upon receipt of a message containing information and a date from a wireless telecommunications network, determines whether said information contained in said message is of a predetermined type and determines, when said information is of said predetermined type, whether an originator of said message is authorized to send said messages containing information of said predetermined type, and if said originator of said message is not authorized, discards said message, wherein if said originator of said message is authorized, and if said message contains information of said predetermined type, said mobile terminal automatically displays said information on said display of said mobile terminal, and if said message does not contain information of said predetermined type, processes said message in accordance with the message and stores said message in a storage for later access by a user of the mobile terminal, and wherein the date is related to when the information was sent to the mobile terminal, older dated information being deleted by one of a user of the mobile terminal and automatically by the mobile terminal based on the date.

3. A mobile terminal comprising:

a display for displaying information, wherein the mobile terminal, upon receipt of a message containing information and a date from a wireless telecommunications network, determines whether said information contained in said message is of a predetermined type and determines, when said information is of said predetermined type, whether an originator of said message is authorized to send said messages containing information of said predetermined type, and if said originator of said message is not authorized, discards said message, wherein when said originator of said message is authorized and said message contains information of said predetermined type, said mobile terminal automatically displays said information on said display of said mobile terminal and performs operations to immediately notify the a of the mobile terminal that information of said predetermined type is being displayed, and if said message does not contain information of said predetermined type, processes said message in accordance with the message, and wherein the date is related to when the information was sent to the mobile terminal, older dated information being deleted by one of a user of the mobile terminal and automatically by the mobile terminal based on the date.

4. The mobile terminal of claim 3, wherein said operations performed by said mobile terminal to notify the user of the mobile terminal includes at least one of providing an indicator on the display of the mobile terminal, providing an audio signal, and providing a vibratory signal.

5. In a wireless telecommunications system including a wireless telecommunications network which communicates with a plurality of mobile terminals using radio signals, wherein each mobile terminal includes a display for displaying information, a method of automatically displaying information of a predetermined type on said display comprising:

receiving in a mobile terminal of a registered user a message containing a date and information including at least one of alphanumeric, audio, video, graphics and animation information, when said mobile terminal enters a predetermined area based on location information of said mobile terminal or location information of said mobile terminal and profile information of the registered user;

determining whether said information contained in said message is of a predetermined type;

determining, when said information is of said predetermined type, whether an originator of said message is authorized to send said messages containing information of said predetermined type; and if said originator of said messages is not authorized, discarding said message;

if said message contains information of said predetermined type and said originator of said message is authorized, automatically displaying said information on said display of said mobile terminal; and if said message does not contain information of said predetermined type, processing said message in accordance with the message and storing said message in a storage for later access by the registered user of the mobile terminal, wherein the date is related to when the information was sent to the mobile terminal, older dated information being deleted by one of the registered user of the mobile terminal and automatically by the mobile terminal based on the date.

6. A wireless telecommunications system comprising:

a plurality of mobile terminals; and a wireless telecommunications network which communicates with said mobile terminals using radio signals, wherein each mobile terminal includes a display for displaying information, wherein each mobile terminal, upon receipt of a message containing a date and information including at least one of alphanumeric, audio, video, graphics and animation information, when said mobile terminal enters a predetermined area based on location information of said mobile terminal or location information of said mobile terminal and profile information of a registered user of the mobile terminal, from said wireless telecommunications network, determines whether said information contained in said message is of a predetermined type and determines, when said information is of said predetermined type, whether an originator of said message is authorized to send said messages containing information of said predetermined type, and if said originator of said message is not authorized, discards said message;

wherein if said originator of said message is authorized, and if said message contains information of said predetermined type, each mobile terminal automatically displays said information on said display of said mobile terminal, and if said message does not contain information of said predetermined type, processes said message in accordance with the message and stores said message in a storage for later access by the user of the mobile terminal, and wherein the date is related to when the information was sent to the mobile terminal, older dated information being deleted by one of the registered user of the mobile terminal and automatically by the mobile terminal based on the date.

* * * * *